(No Model.)

B. P. BOWER.
SEWER TRAP.

No. 339,851. Patented Apr. 13, 1886.

WITNESSES:

B. P. Bower INVENTOR

BY Jno. Crowell

ATTORNEY

UNITED STATES PATENT OFFICE.

BUCKLAND P. BOWER, OF CLEVELAND, OHIO.

SEWER-TRAP.

SPECIFICATION forming part of Letters Patent No. 339,851, dated April 13, 1886.

Application filed December 18, 1885. Serial No. 186,074. (No model.)

*To all whom it may concern:*

Be it known that I, BUCKLAND P. BOWER, of Cleveland, in the county of Cuyahoga and State of Ohio, have invented certain new and useful Improvements in Sewer-Traps; and I do hereby declare the following to be a full, clear, and exact description of the invention, such as will enable others skilled in the art to which it pertains to make and use the same.

My invention relates to improvements in sewer-gas traps for wash-basins, bath-tubs, and other similar purposes, in which the pipes from two or more fittings—for instance, the waste and overflow pipe—discharge into the trap below the outlet of the trap—to wit, below the water-line of the trap—to the end that no circulation of air is had through these pipes, and consequently no offensive odors are discharged into the room.

My invention relates more especially to a class of pot or bottle traps having a floating ball-valve and having below the outlet a removable bottom.

With these objects in view my invention consists in certain features of construction and in combination of parts, hereinafter described, and pointed out in the claim.

Figure 1:
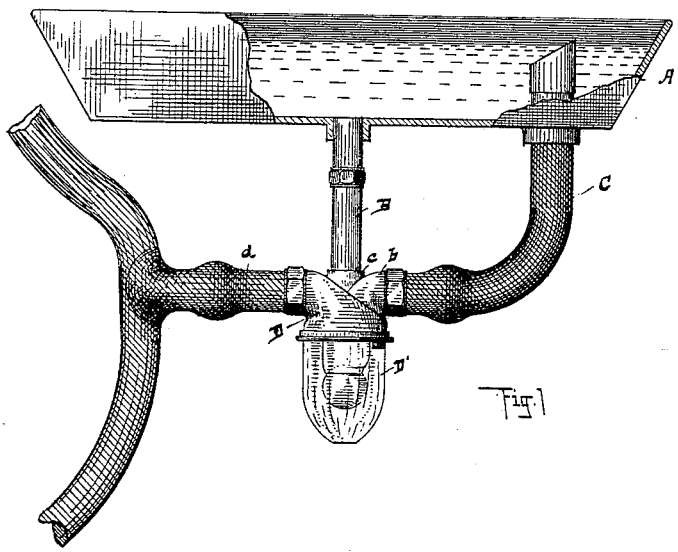
Figure 2:
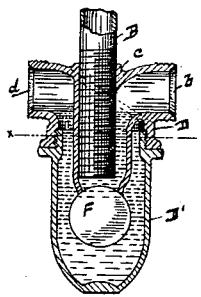
Figure 3:
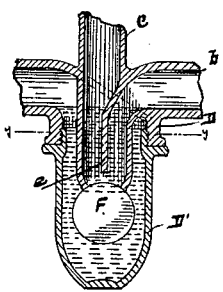
Figure 4:
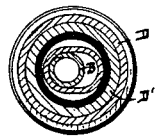
Figure 5:
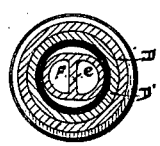

In the accompanying drawings, Figure 1 is an elevation, partly in section, of my improved trap connected with a wash-basin. Figs. 2 and 3 are elevations in section showing different ways of attaching the pipes to the traps in carrying out my invention. Figs. 4 and 5 are transverse sections, respectively, on the lines *x x* and *y y*, Figs. 2 and 3.

A represents the basin, with a discharge-pipe, B, and an overflow-pipe, C.

D represents the body of the trap, to which is secured in the usual manner the detachable bottom D' and the discharge-pipe *d*.

It will be observed that the pipes B and C discharge separately into the trap and below the water-line in the trap, but have a mouth-piece in common that is closed by the floating ball-valve H. This may be accomplished in various ways. For instance, these two pipes may enter at different points, or a partition, *e*, may be cast in the trap, with suitable nozzles, *b* and *c*, for attaching the respective pipes B and C. In such case the partition *e* extends below the water-line, so that the discharge of the two pipes is kept separate, and both inlets are closed by the valves. Another convenient way is to have the nozzle *c* extend inward below the water-line, and of such size that the pipe B may be screwed into the top of the nozzle *c*, the pipe B in such case extending down through the nozzle below the water-line.

These and various modifications may be had in carrying out my invention. If the trap is of considerable size, three or more pipes in like manner may be made to discharge into the trap separately and below the water-line, so that if desirable, for instance, a bath-tub and wash-basin may have a trap in common.

F represents the valve, that operates in the usual manner—*i. e.*, a trap where the lower end of the inlet is sealed with a floating valve (substantially such a trap as shown and described in Letters Patent No. 189,888, granted to B. P. Bower, April 24, 1877,)—wherein it is necessary that the several inlets discharge into the body of the trap through a single opening, that they may be sealed with a single valve and in the "pot or bottle" trap, as shown in Fig. 1, whether with or without the valve, where it is necessary that the several inlets should enter above the water-line or the removable portion.

Heretofore, especially in these styles of traps, the overflow or waste from other fixtures have usually been united or open into each other before entering the trap, and if these pipes become foul a current of air through the same would discharge offensive odors into the room.

In certain forms of traps, and with certain construction of others, the several inlets are connected to the body at different points below the water-line; but where the lower portion is removable, or where the floating valve is used, this would be impracticable, and especially in such cases is my invention useful.

With my improved traps these pipes discharge separately below the water-line, and there can be no current of air through the pipes.

What I claim is—

The combination, with a trap consisting of a separable body and top, the latter being constructed of metal and provided with a discharge-outlet and the two inlets, substantially as described, connected together within the body of the trap and having a common discharge-mouth, of a floating valve located within the body of the trap below the common discharge-mouth of the inlet-pipes and adapted to close said mouth, substantially as set forth.

In testimony whereof I sign this specification, in the presence of two witnesses, this 11th day of December, 1885.

BUCKLAND P. BOWER.

Witnesses:
G. W. SHUMWAY,
N. S. AMSTUTZ.